United States Patent

Wang

[11] Patent Number: 5,836,602
[45] Date of Patent: Nov. 17, 1998

[54] COLLAPSIBLE BICYCLE

[76] Inventor: Ping-Tien Wang, 15th Fl., No. 135, Ching Tung St., Tainan Hsien, Taiwan

[21] Appl. No.: 909,961

[22] Filed: Aug. 12, 1997

[51] Int. Cl.⁶ .................................................. B62K 15/00
[52] U.S. Cl. ........................................... 280/287; 280/287
[58] Field of Search ..................................... 280/287, 278, 280/274, 281.1

[56] References Cited

U.S. PATENT DOCUMENTS

| | | | |
|---|---|---|---|
| 3,374,009 | 3/1968 | Jeunet | 280/287 |
| 4,202,561 | 5/1980 | Yonkers | 280/287 |
| 4,379,566 | 4/1983 | Titcomb | 280/278 |
| 4,566,713 | 1/1986 | Hon | 280/287 |
| 4,579,360 | 4/1986 | Nishimura et al. | 280/287 |
| 4,634,138 | 1/1987 | Fryer et al. | 280/287 |
| 4,844,494 | 7/1989 | Blanchard | 280/278 |
| 5,337,609 | 8/1994 | Hsu | 280/287 |
| 5,440,948 | 8/1995 | Cheng | 280/287 |
| 5,492,350 | 2/1996 | Pan | 280/278 |

FOREIGN PATENT DOCUMENTS

| | | | |
|---|---|---|---|
| 1106626 | 5/1961 | Germany | 280/278 |
| 6-32272 | 2/1992 | Japan | 280/287 |
| 435978 | 1/1975 | U.S.S.R. | 280/278 |
| 1104046 | 7/1984 | U.S.S.R. | 280/278 |
| 1112828 | 5/1968 | United Kingdom | 280/287 |

*Primary Examiner*—Anne Marie Soehler
*Assistant Examiner*—Michael Cuff
*Attorney, Agent, or Firm*—William E. Pelton

[57] ABSTRACT

A collapsible bicycle includes a body frame including a front wheel rotatably mounted on a first end portion thereof, and a seat tube fixedly mounted on a second end portion thereof. A rear frame includes an upright tube disposed beneath the seat tube, a pair of seat stays each extending from the upright tube, a rear wheel rotatably mounted between the pair of seat stays, and a pair of supporting brackets each having a first end portion fixedly mounted on a corresponding one of the pair of seat stays and a second end portion located at a position flush with the rear wheel. A pivot mechanism is pivotally connected between the seat tube and the upright tube such that the upright tube can be pivoted relative to the seat tube, thereby pivoting the rear frame toward the front wheel of the body frame to a position where the second end portion of each of the two supporting brackets together with the rear wheel can be supported on the ground synchronously.

3 Claims, 7 Drawing Sheets

COLLAPSIBLE BICYCLE

FIELD OF THE INVENTION

The present invention relates to a collapsible bicycle.

BACKGROUND OF THE INVENTION

A conventional collapsible bicycle generally includes a complicated structure such that it is not easy to fold the collapsible, thereby causing an inconvenience in operation.

In addition, the conventional collapsible bicycle needs to be provided with a kickstand with a foot post for supporting the bicycle. However, the total weight of the bicycle is concentrated on a front part thereof when it is folded, thereby greatly increasing the force exerted on the foot post such that the foot post possibly cannot be used to support the folded bicycle stably.

The present invention has arisen to mitigate and/or obviate the disadvantages of the conventional collapsible bicycle.

SUMMARY OF THE INVENTION

In accordance with one aspect of the present invention, there is provided a collapsible bicycle comprising a body frame including a first end portion and a second end portion, a front wheel rotatably mounted on the first end portion of the body frame, and a seat tube fixedly mounted on the second end portion of the body frame.

A rear frame includes an upright tube disposed beneath the seat tube, a pair of seat stays each extending rearward from the upright tube, a rear wheel rotatably mounted between the pair of seat stays, and a pair of supporting brackets each having a first end portion fixedly mounted on a corresponding one of the pair of seat stays and a second end portion located at a position flush with the rear wheel.

A pivot mechanism is pivotally connected between the seat tube and the upright tube such that the upright tube can be pivoted relative to the seat tube, thereby pivoting the rear frame toward the front wheel of the body frame to a position where the second end portion of each of the two supporting brackets together with the rear wheel can be supported on the ground synchronously.

Further features of the present invention will become apparent after a careful reading of the detailed description with appropriate reference to the accompanying drawings.

DETAILED DESCRIPTION OF THE PREFERRED EMBODIMENTS

Figure 1:
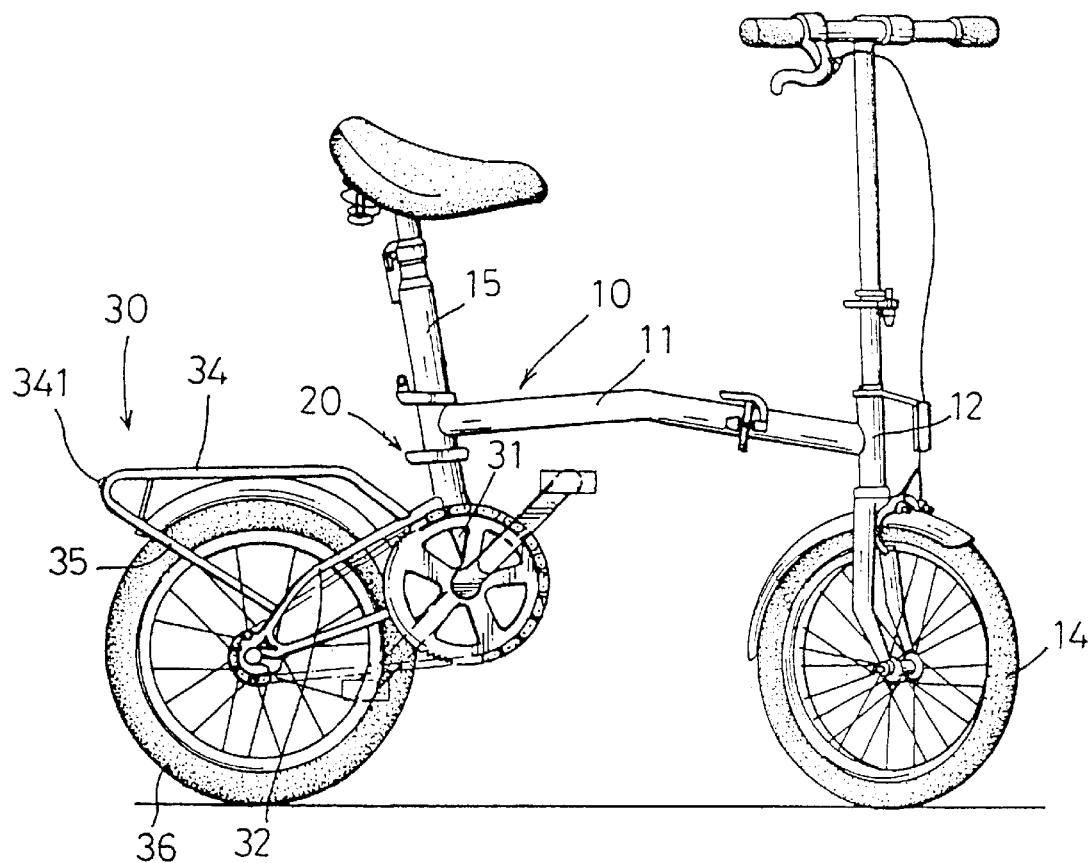
FIG. 1 is a front plan view of a collapsible bicycle in accordance with the present invention.
Figure 2:
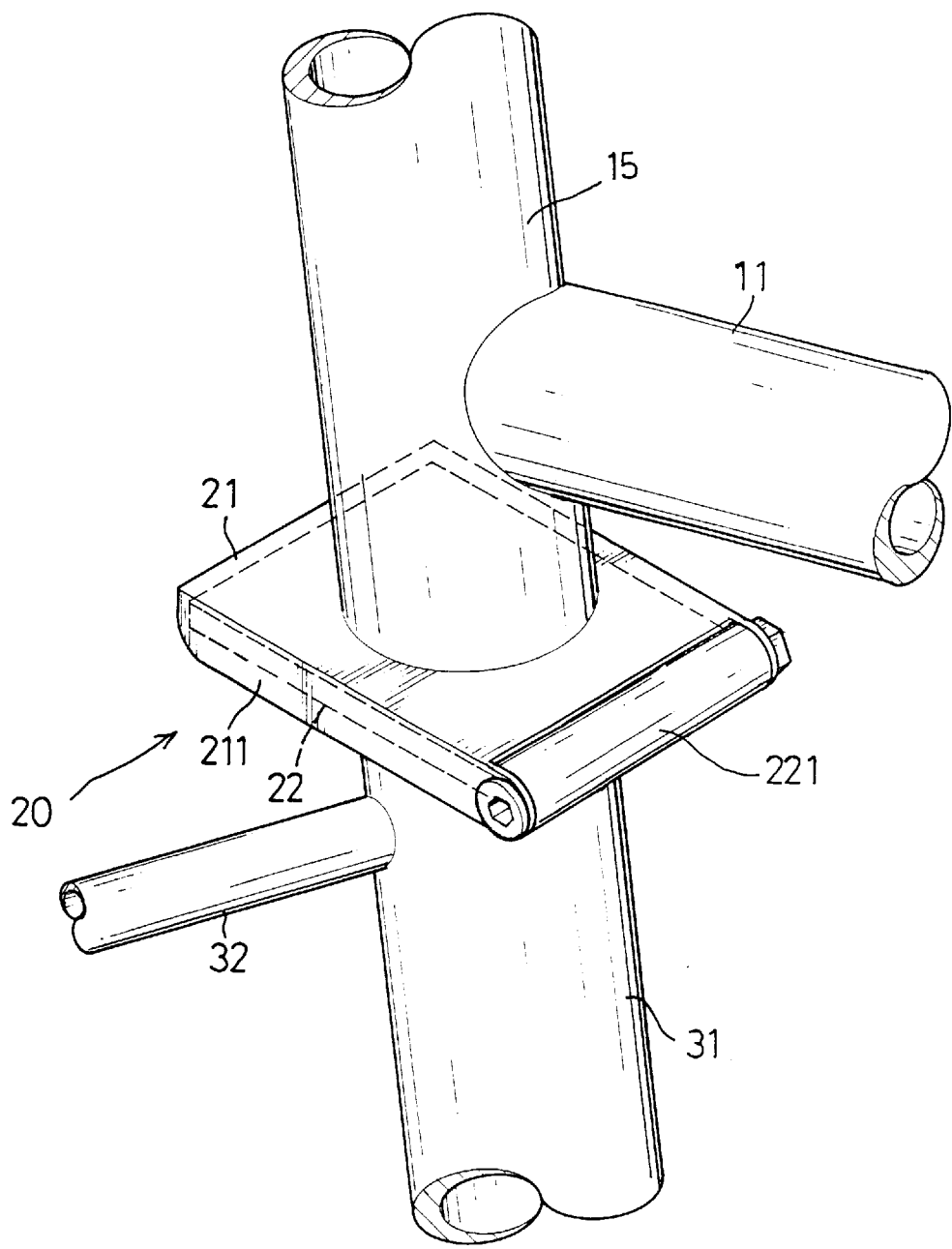
FIG. 2 is a perspective view of a pivot mechanism of the collapsible bicycle.
Figure 3:
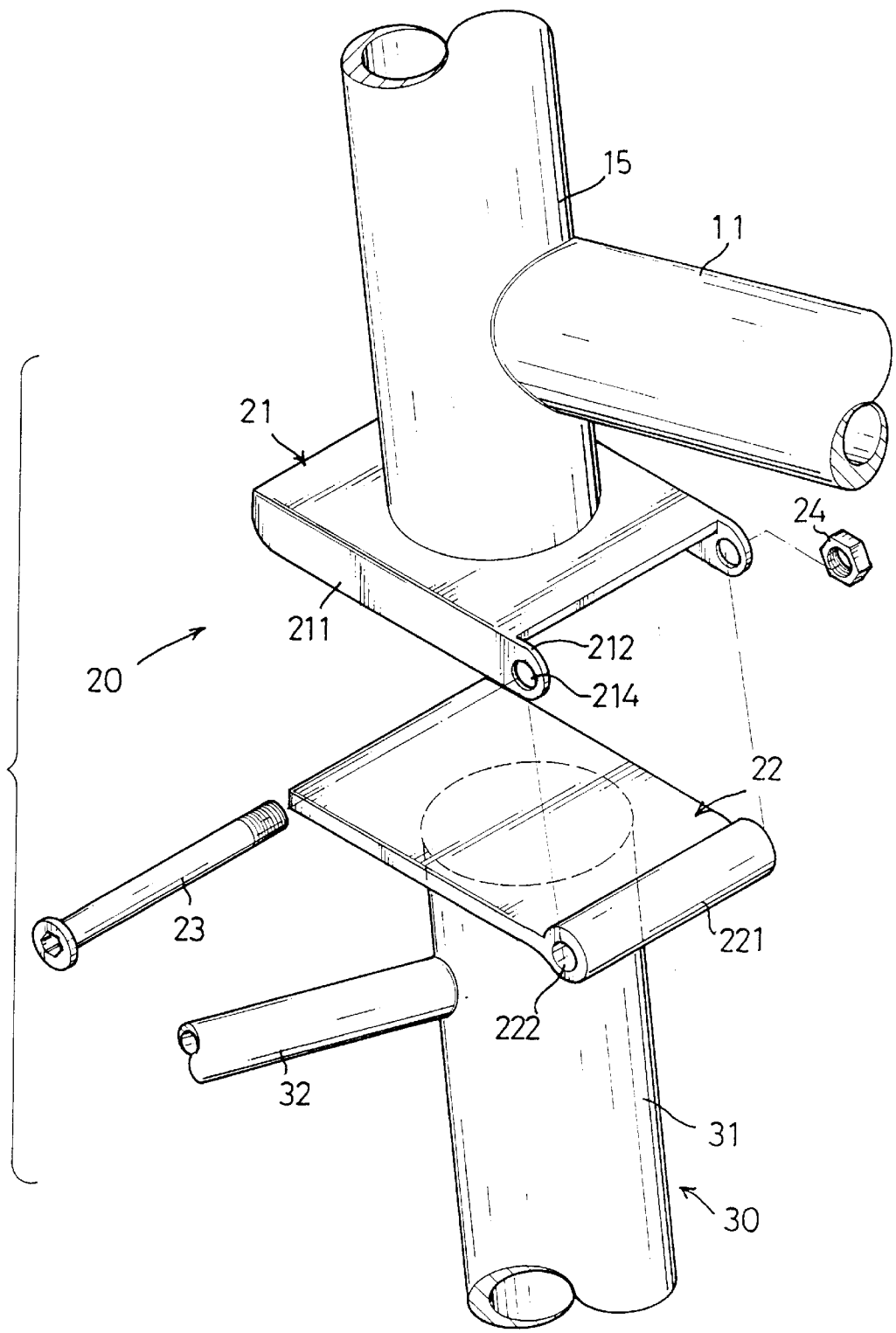
FIG. 3 is an exploded view of FIG. 2.

Referring to FIGS. 1–3, a collapsible bicycle according to the present invention comprises a body frame 10 including a top tube 11 having a first end portion connected with a head tube 12 and a second end portion connected with a seat tube 15, and a front wheel 14 rotatably disposed under the head tube 12.

A rear frame 30 includes an upright tube 31 disposed beneath the seat tube 15, a pair of seat stays 32 each extending rearward from the upright tube 31, a rear wheel 36 rotatably mounted between the pair of seat stays 32, and a pair of supporting brackets 34 each having a first end portion mounted on a first end portion of a corresponding one of the pair of seat stays 32 and a second end portion 341 located at a position flush with the rear wheel 36, and an extension 35 extending from the second end portion 341 to be connected with a second end portion of the seat stay 32.

A pivot mechanism 20 is pivotally connected between the seat tube 15 and the upright tube 31 such that the upright tube 31 can be pivoted relative to the seat tube 15.

The pivot mechanism 20 includes an upper pivot base 21 fixedly mounted on a lower portion of the seat tube 15, and a lower pivot base 22 fixedly mounted on an upper portion of the upright tube 31 and pivotally connected with the upper pivot base 21.

The upper pivot base 21 is substantially inverted U-shaped with two vertical pieces 211 each having a first end portion formed with an ear 212 transversely defining a bore 214 therein.

The lower pivot base 22 is pivotally fitted between the two vertical pieces 211 and includes a first end portion formed with a tubular rib 221 fitted between the two ears 212 and transversely defining a hole 222 therein which aligns with the bore 214 of each of the two ears 212.

A pivot axle 23 extends through the bore 214 of each of the two ears 212 and the hole 222 of the tubular rib 221 and is engaged with a retaining nut 24 such that the lower pivot base 22 can be pivoted relative to the upper pivot base 21.

Figure 4:
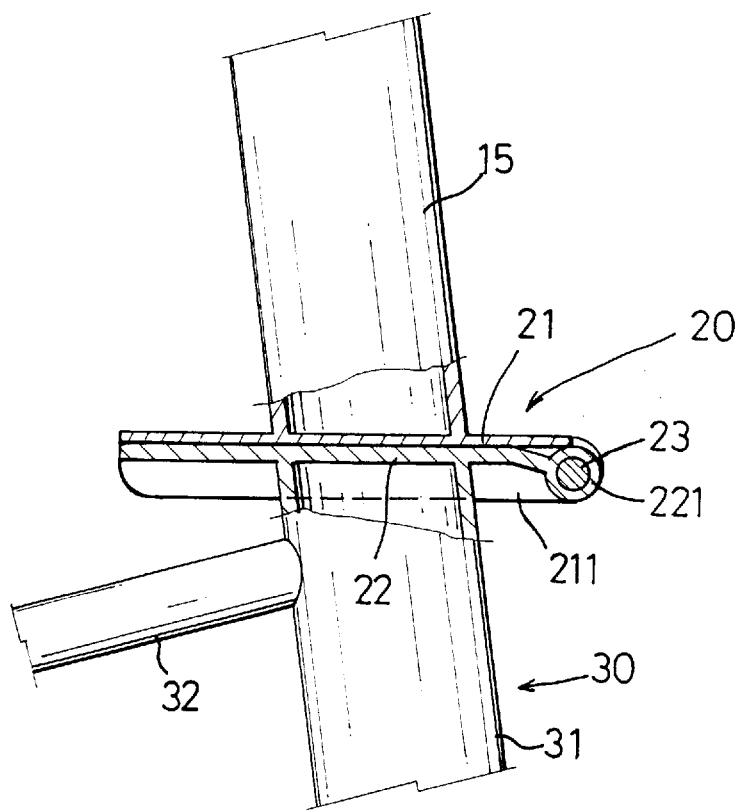
FIG. 4 is a front plan partially cross-sectional view of FIG. 2.
Figure 5:
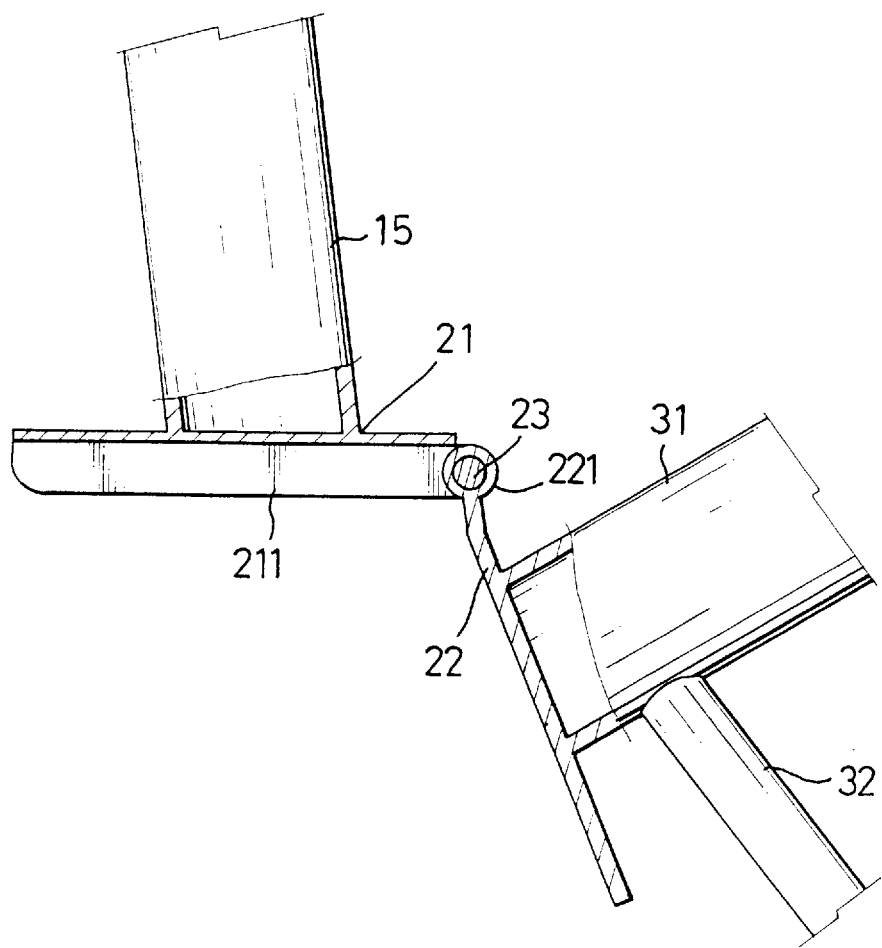
FIG. 5 is an operational view of FIG. 4.
Figure 6:
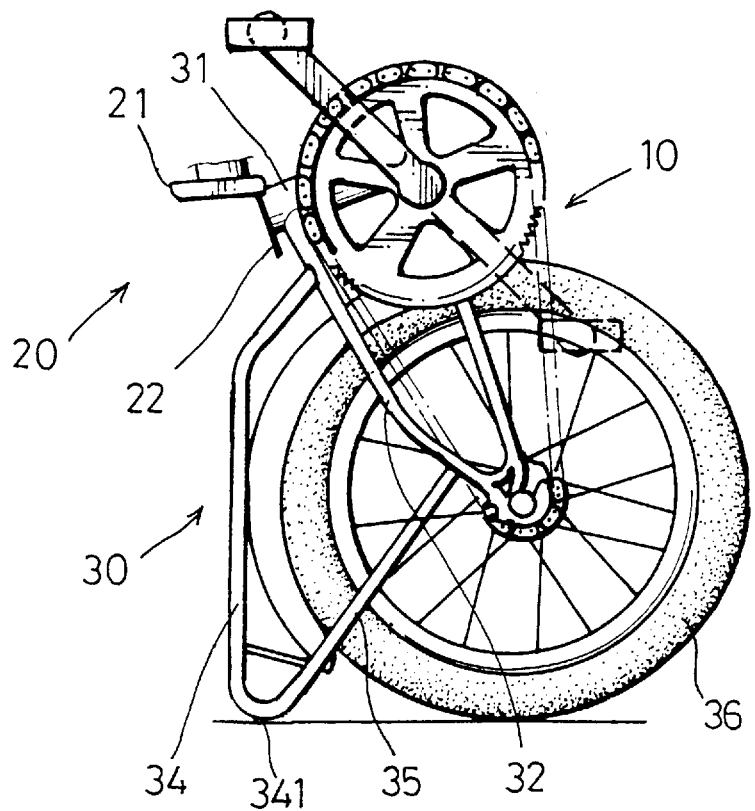
FIG. 6 is an enlarged front plan view showing a rear frame being disposed in a folded status.
Figure 7:
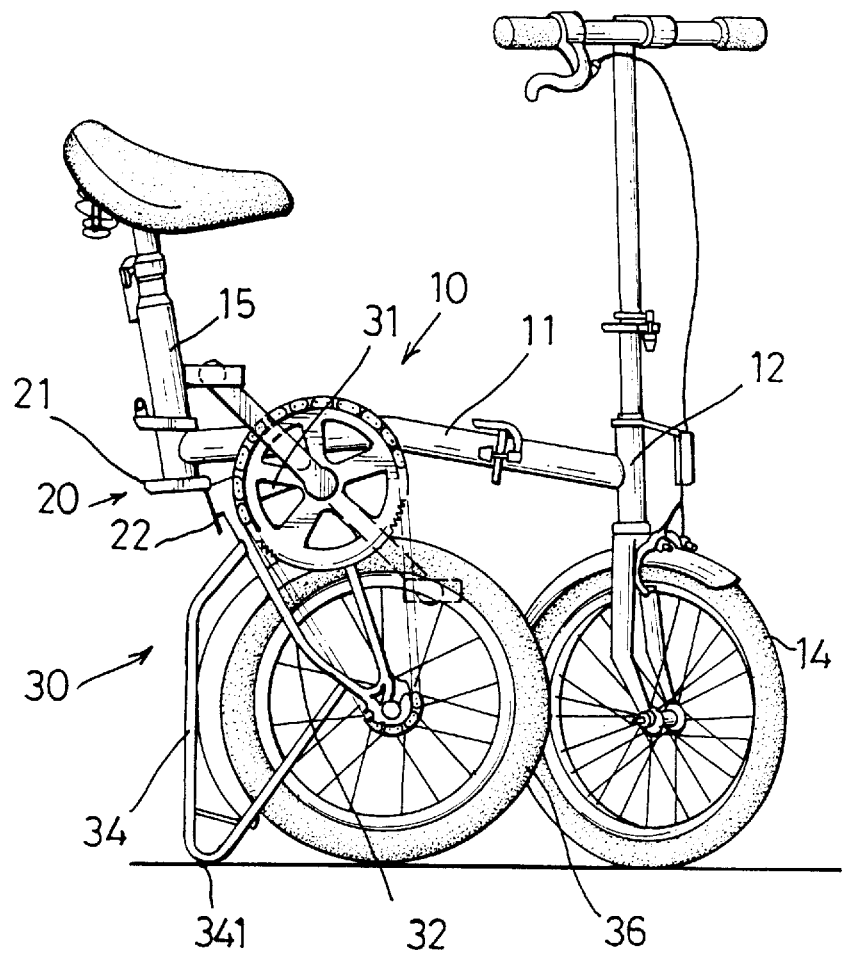
FIG. 7 is a front plan view showing the collapsible bicycle of FIG. 1 being disposed in a folded status.

In operation, referring to FIGS. 4–7 with reference to FIG. 1, the upright tube 31 can be pivoted relative to the seat tube 15 by means of the pivot mechanism 20, thereby pivoting the rear frame 30 toward the front wheel 14 of the body frame 10 from a first position as shown in FIG. 4 to a second position as shown in FIGS. 5 and 6 where the second end portion 341 of each of the two supporting brackets 34 together with the rear wheel 36 can be stably supported on the ground synchronously, thereby easily folding the rear frame 30 as shown in FIG. 7.

Accordingly, by such an arrangement, the rear frame 30 can be easily folded such that the space occupied by the collapsible bicycle can be efficiently decreased.

It should be clear to those skilled in the art that further embodiments of the present invention may be made without departing from the scope and spirit of the present invention.

What is claimed is:

1. A collapsible bicycle comprising:

a body frame (10) including a first end portion and a second end portion, a front wheel (14) rotatably mounted on said first end portion of said body frame (10), and a seat tube (15) fixedly mounted on said second end portion of said body frame (10);

a rear frame (30) including an upright tube (31) disposed beneath said seat tube (15), a pair of seat stays (32) each extending from said upright tube (31), a rear wheel (36) rotatably mounted between said pair of seat stays (32), and a pair of supporting brackets (34) each having a first end portion fixedly mounted on a corresponding one of said pair of seat stays (32) and a second end portion (341) located at a position flush with said rear wheel (36); and a pivot mechanism (20) pivotally connected between said seat tube (15) and said upright tube (31) such that said upright tube (31) can be pivoted relative to said seat tube (15), thereby pivoting said rear frame (30) toward said front wheel (14) of said body frame (10) to a position where said second end portion (341) of each of said two supporting brackets (34) together with said rear wheel (36) can be supported on the ground synchronously.

2. The collapsible bicycle in accordance with claim 1, wherein said pivot mechanism (20) includes an upper pivot base (21) fixedly mounted on a lower portion of said seat tube (15), and a lower pivot base (22) fixedly mounted on an upper portion of said upright tube (31) and pivotally connected with said upper pivot base (21).

3. The collapsible bicycle in accordance with claim 2, wherein said upper pivot base (21) is substantially inverted U-shaped with two vertical pieces (211) each having a first end portion (212) transversely defining a bore (214) therein, said lower pivot base (22) pivotally fitted between said two vertical pieces (211) and including a first end portion (221) transversely defining a hole (222) therein and aligning with said bore (214) of each of said two vertical pieces (211), and a pivot axle (23) extending through said bore (214) of each of said two vertical pieces (211) and said hole (222) of said lower pivot base (22) such that said lower pivot base (22) can be pivoted relative to said upper pivot base (21).

\* \* \* \* \*